United States Patent [19]

Samonil et al.

[11] Patent Number: 5,558,188
[45] Date of Patent: Sep. 24, 1996

[54] VIBRATION DAMPER FOR A MOTOR VEHICLE SUSPENSION

[75] Inventors: Otto Samonil, Niederwerrn; Steffen Kraus, Schweinfurt, both of Germany

[73] Assignee: Fichtel & Sachs AG, Schweinfurt, Germany

[21] Appl. No.: 500,179

[22] Filed: Jul. 10, 1995

[30] Foreign Application Priority Data

Jul. 12, 1994 [DE] Germany ............... 44 24 436.3

[51] Int. Cl.$^6$ ............... F16F 9/46; F16K 31/02; B60G 17/08
[52] U.S. Cl. ............... 188/299; 188/322.13
[58] Field of Search ............... 188/299, 322.13, 188/322.14, 322.15, 282, 316–319; 280/707, 714; 251/129.01

[56] References Cited

U.S. PATENT DOCUMENTS

| | | | |
|---|---|---|---|
| 4,401,196 | 8/1983 | Grundei | 188/282 |
| 4,850,460 | 7/1989 | Knecht et al. | 188/299 |
| 4,880,086 | 11/1989 | Knecht et al. | 188/299 |
| 4,993,524 | 2/1991 | Grundei et al. | 188/322.22 |
| 5,398,787 | 3/1995 | Wossner | 188/299 |
| 5,449,055 | 9/1995 | Geiling et al. | 188/299 |
| 5,467,851 | 11/1995 | Handke et al. | 188/299 |

FOREIGN PATENT DOCUMENTS

| | | |
|---|---|---|
| 0867333 | 2/1953 | Germany . |
| 2023543 | 12/1971 | Germany . |
| 2457559 | 6/1975 | Germany . |
| 3015596 | 10/1981 | Germany . |
| 3840302 | 5/1990 | Germany . |
| 4114305 | 6/1992 | Germany . |

*Primary Examiner*—Robert J. Oberleitner
*Assistant Examiner*—Chris Schwartz
*Attorney, Agent, or Firm*—Nils H. Ljungman and Associates

[57] ABSTRACT

A motor vehicle suspension system for damping vibrations between, for example, the wheels of the motor vehicle and the body of the motor vehicle, can have a vibration damper unit with two fluid chambers therein and separated from one another by a piston unit. In addition, there can be a fluid bypass connecting the two chambers. A shut-off valve device can be disposed between two portions of the fluid connection to separate a high-pressure section and a low-pressure section, and the latter shut-off valve has a shutoff body which can be adjusted by an external control by means of a magnet armature and a magnet coil between a closed and an open position. The high pressure section empties into a central channel, and a first side of the shut-off valve body which is pressurized by the high pressure section can be elastically pressed against a shut-off valve seat by means of a compression spring, whereby the first side of the shut-off valve body is connected by means of an after-throttle to a second side of the shut-off valve body. Within the fluid connection there can be a segment which provides a pressure reduction by means of at least one throttle point in combination with a baffle device which is connected to the throttle point.

16 Claims, 4 Drawing Sheets

VIBRATION DAMPER FOR A MOTOR VEHICLE SUSPENSION

BACKGROUND OF THE INVENTION

1. Field of the Invention

The present invention generally relates to a vibration damper for a motor vehicle suspension system for damping vibrations between, for example, the wheels of the motor vehicle and the body of the motor vehicle. Such a vibration damper will generally have two fluid chambers separated from one another by a piston unit. In addition, there can be a fluid bypass connecting the two chambers. In this regard, a more specific aspect of the present invention generally relates to a shut-off valve module for this fluid connection. The shut-off valve device has at least one shut-off valve which separates a high-pressure section and a low-pressure section of the fluid connection. By means of a magnet armature and a magnet coil, the shut-off valve can typically have a shutoff body which can be adjusted between a closed and an open position by an external control. The high pressure section of the fluid connection can empty into a central channel, and a first side of the shut-off valve body, which first side can be pressurized by the high pressure section, can be elastically pressed against a shut-off valve seat by means of a compression spring. In addition, the first side of the shut-off valve body can be connected by means of an after-throttle to a second side of the shut-of valve body.

2. Background Information

One such shut-off valve module of the type described above is disclosed, for example, in German Patent No. 41 14 305. In general, for the development of an adjustable vibration damper with a shut-off valve module, the characteristics to be achieved by the vibration damper are specified by the vehicle manufacturer. The components of the conventional portion of the vibration damper, and also of the shut-off valve module, are then designed on the basis of these characteristics. It has been found however, that the vibration damper may generate unacceptable hissing noises.

Even an experienced vibration damper designer can typically be unable to determine in advance whether the hissing noises will occur in the finished vibration damper. Basic tests have shown that the hissing noises are: essentially a function of the flow velocity of the damping medium, but no reproducible relationships have been found between the hissing noises and the individual components of the vibration damper. In constructing a vibration damper, the characteristics of the vibration damper must correspond to the needs of the particular vehicle. For this purpose, the sizes of the individual components can essentially be determined, but there are essentially no available measures for preventing hissing noises.

OBJECT OF THE INVENTION

The object of the present invention is to use the simplest possible means to eliminate hissing noises in vibration dampers.

SUMMARY OF THE INVENTION

The invention teaches that this object can be achieved if, inside the fluid connection, there is a section which provides a pressure reduction by means of at least one throttle point in combination with a baffle device connected to the throttle point. During the pressure increase, a precise path is specified for the damping medium, which path leaves no free space for any spraying or foaming that might result in the generation of noise.

In one particularly advantageous embodiment, the section for providing the pressure reduction can be formed by a thimble-like insert that fits into the fluid connection. In essence, this thimble-like insert can preferably be designed to be retro-fitted into a valve unit. As such, no reconstruction measures would typically be required on the finished vibration damper. The baffles and throttles can be formed by the thimble-like insert, and the thimble-like insert can be provided with at least one radial opening, the outlet of which opening can preferably be oriented radially toward the wall of the central channel.

If the pressure decrease within the section for providing pressure reduction is insufficient, the present invention teaches that there can be at least one additional throttle point connected to the thimble-like insert, which throttle point has an offset with respect to the after-throttle. The additional throttle point can thereby form an additional smoothing or damping chamber, in conjunction with the thimble-like insert.

In an alternative variant, the section for providing the reduction in pressure can preferably have a series arrangement of separate throttle cross sections, whereby the throttle cross sections can each be offset in relation to one another, and at least one throttle cross section can be realized inside a throttle plate. A throttle plate can also be inserted subsequently, or retro-fitted, as can the thimble-like insert, into an already assembled valve unit. It has thereby been determined to be particularly advantageous if the series arrangement is located in the central channel.

In accordance with at least one embodiment of the present invention, valve units can thereby be pre-assembled, or produced in large quantities, without the above-discussed thimble-like insert, or throttle plate included therewith. Then, for individual vibration dampers of various kinds, tests could preferably be conducted to determine whether each of the various vibration dampers would hiss under various operating conditions and loads with the valve unit. If a hissing is determined to occur for one particular vibration damper under a particular set of operating conditions, all of the valve units which will be assembled to vibration dampers of that particular model can then be retro-fitted with the necessary pressure reducing elements. On the other hand, for vibration dampers which are found not make a hissing noise using that particular valve unit, no further valve assembly would then be necessary, and the pre-assembled valve units could be installed as is.

The embodiments of the present invention as set forth above, will be discussed in more detail herebelow with reference to the accompanying drawings. It should be understood that when the word "invention" is used in this application, the word "invention" includes "inventions", that is, the plural of "invention". By stating "invention", Applicants do not in any way admit that the present application does not include more than one patentably and non-obviously distinct invention, and maintains the possibility that this application may include more than one patentably and non-obviously distinct invention. The Applicants hereby assert that the disclosure of this application may include more than one invention, and, in the event that there is more than one invention, that these inventions may be patentable and non-obvious, one with respect to the other.

One aspect of the invention resides broadly in a vibration damper for a suspension of a motor vehicle for damping vibrations between a wheel and a frame of a motor vehicle, the vibration damper having an exterior, the exterior defining a side of the vibration damper, and the vibration damper comprising: a cylinder; the cylinder defining a chamber therewithin; the cylinder having a first end and a second end, and the cylinder defining a longitudinal dimension between the first end and the second end; apparatus for connecting the cylinder to one of: a wheel and a frame of a motor vehicle; a piston rod; the piston rod extending along the longitudinal dimension and extending through the first end of the cylinder; the piston rod having a first end within the cylinder and a second end outside of the cylinder; apparatus for connecting the piston rod to the other of: a wheel and a frame of a motor vehicle; a piston disposed at the first end of the piston rod; the piston dividing the chamber into a first chamber portion and a second chamber portion; damping fluid disposed within the first chamber portion and the second chamber portion; fluid passage apparatus connecting the first chamber portion and the second chamber portion for bypassing fluid around the piston; valve apparatus for regulating flow of damping fluid through the fluid passage apparatus; and an electromagnet for controlling operation of the valve apparatus; the valve apparatus being attached to the side of the vibration damper, and the valve apparatus comprising: a valve seat; a valve closure member disposed adjacent the valve seat for closing against the valve seat; apparatus for closing the valve closure member with respect Go the valve seat to substantially close the fluid passage apparatus; apparatus for permitting opening of the valve closure member with respect to the valve seat to open the fluid passage apparatus; the electromagnet comprising apparatus for operating at least one of: the apparatus for permitting opening and the apparatus for closing; at least one fluid passage portion disposed adjacent the valve seat, the at least one fluid passage portion defining a longitudinal direction extending away from the valve seat; and apparatus disposed in the at least one fluid passage portion for diverting fluid flow within the at least one fluid passage portion through at least one substantial angle with respect to the longitudinal direction.

Another aspect of the invention resides broadly in a vibration damper for a motor vehicle for damping vibrations between first and second components of the motor vehicle, the vibration damper comprising: a cylinder; the cylinder defining a chamber therewithin; the cylinder having a first end and a second end, and the cylinder-defining a longitudinal dimension between the first and second ends thereof; apparatus for connecting the cylinder to one of the first and second components of a motor vehicle; a piston rod; the piston rod extending along the longitudinal dimension and extending through the first end of the cylinder; the piston rod having a first end within the first cylinder and a second end outside of the cylinder; apparatus for connecting the piston rod to the other of the first and second components of a motor vehicle; a piston disposed at the first end of the piston rod; the piston dividing the chamber into a first chamber portion between the piston and the first end of the cylinder, and a second chamber portion between the piston and the second end of the cylinder; damping fluid disposed within the first chamber portion and the second chamber portion; fluid passage apparatus connecting the first chamber portion and the second chamber portion for bypassing damping fluid around the piston; and valve apparatus for regulating flow of damping fluid through the fluid passage apparatus, the valve apparatus comprising: a valve seat; a valve closure member disposed adjacent the valve seat for closing against the valve seat; apparatus for permitting movement of the valve closure member with respect to the valve seat to substantially close the fluid passage apparatus; apparatus for permitting movement of the valve closure member with respect to the valve seat to open the fluid passage apparatus; at least one fluid passage portion disposed adjacent the valve seat, the at least one fluid passage portion defining a longitudinal direction extending away from the valve seat; at least a substantial portion of the at least one fluid passage portion having a cross-sectional dimension substantially transverse to the longitudinal direction; at least one throttle apparatus disposed in the at least one fluid passage portion for reducing a pressure of damping fluid flowing throw the at least one fluid passage portion; and the at least one throttle apparatus having an opening therethrough, the opening having a cross-sectional dimension, and the cross-sectional dimension of the opening being substantially less than the cross-sectional dimension of the at least a substantial portion of the at least one fluid passage portion.

A still further aspect of the invention resides broadly in a kit for reducing noise produced by damping fluid moving within a damping valve of a vibration damper, the vibration damper comprising: a cylinder; the cylinder defining a chamber therewithin; the cylinder having a first end and a second end, and the cylinder defining a longitudinal dimension between the first and second ends; a piston rod; the piston rod extending along the longitudinal dimension and extending through the first end of the first cylinder; the piston rod having a first end within the first cylinder and a second end outside of the first cylinder; a piston disposed at the first end of the piston rod; the piston dividing the chamber into a first chamber portion and a second chamber portion; dumping fluid disposed within the first chamber portion and the second chamber portion; fluid passage apparatus connecting the first chamber portion and second chamber portion for bypassing damping fluid around the piston; and the damping valve, the damping valve comprising valve apparatus for regulating flow of damping fluid through the fluid passage apparatus, the valve apparatus comprising: a valve seat; a valve closure member disposed adjacent the valve seat for closing against the valve seat; apparatus for permitting movement of the valve closure member with respect to the valve seat to substantially close the fluid passage apparatus; apparatus for permitting movement of the valve closure member with respect to the valve seat to open the fluid passage apparatus; at least one fluid passage portion disposed adjacent the valve seat, the at least one fluid passage portion defining a longitudinal direction extending away from the valve seat, at least a substantial portion of the at least one fluid passage portion having a cross-sectional dimension substantially transverse to the longitudinal direction; and the kit comprising: a member for being inserted into the at least one fluid passage portion, the member comprising: apparatus for substantially reducing the cross-sectional dimension of an additional portion of the at least one fluid passage portion.

BRIEF DESCRIPTION OF THE DRAWINGS

The present invention is explained in greater detail below with reference to the embodiments illustrated in the accompanying drawings, in which.

DESCRIPTION OF THE PREFERRED EMBODIMENTS

Figure 1:
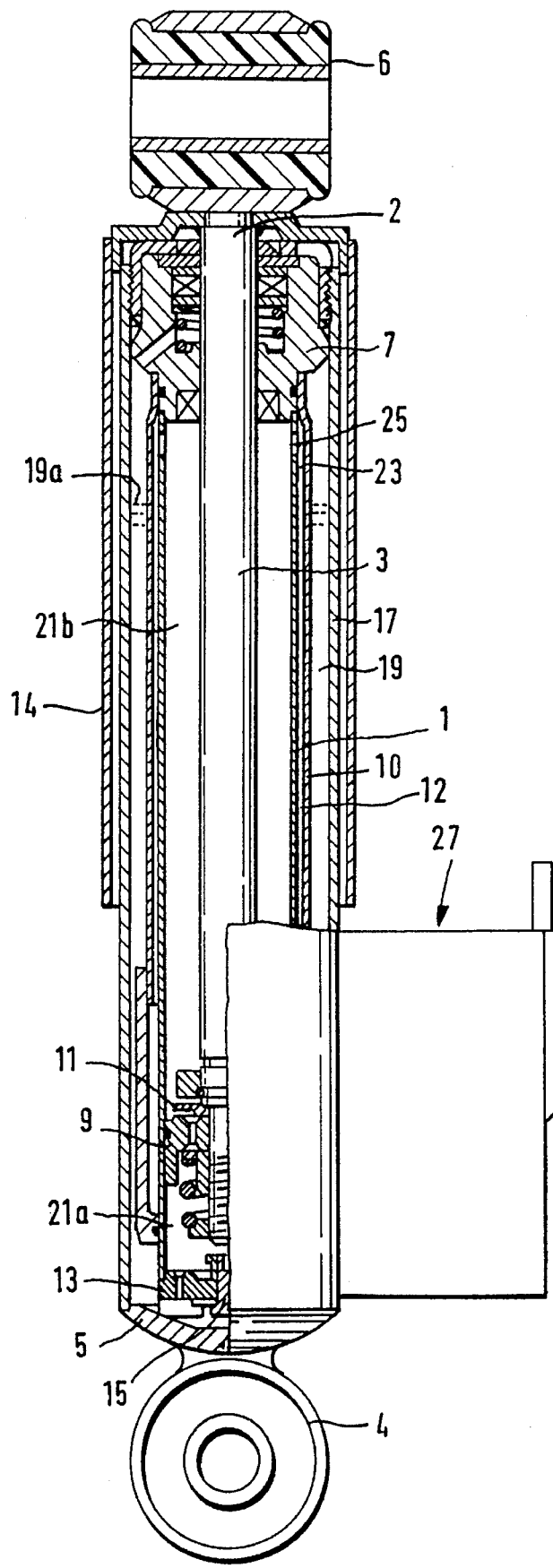
FIG. 1 shows a vibration damper with a bypass and a shut-off valve in the bypass.
Figure 4:
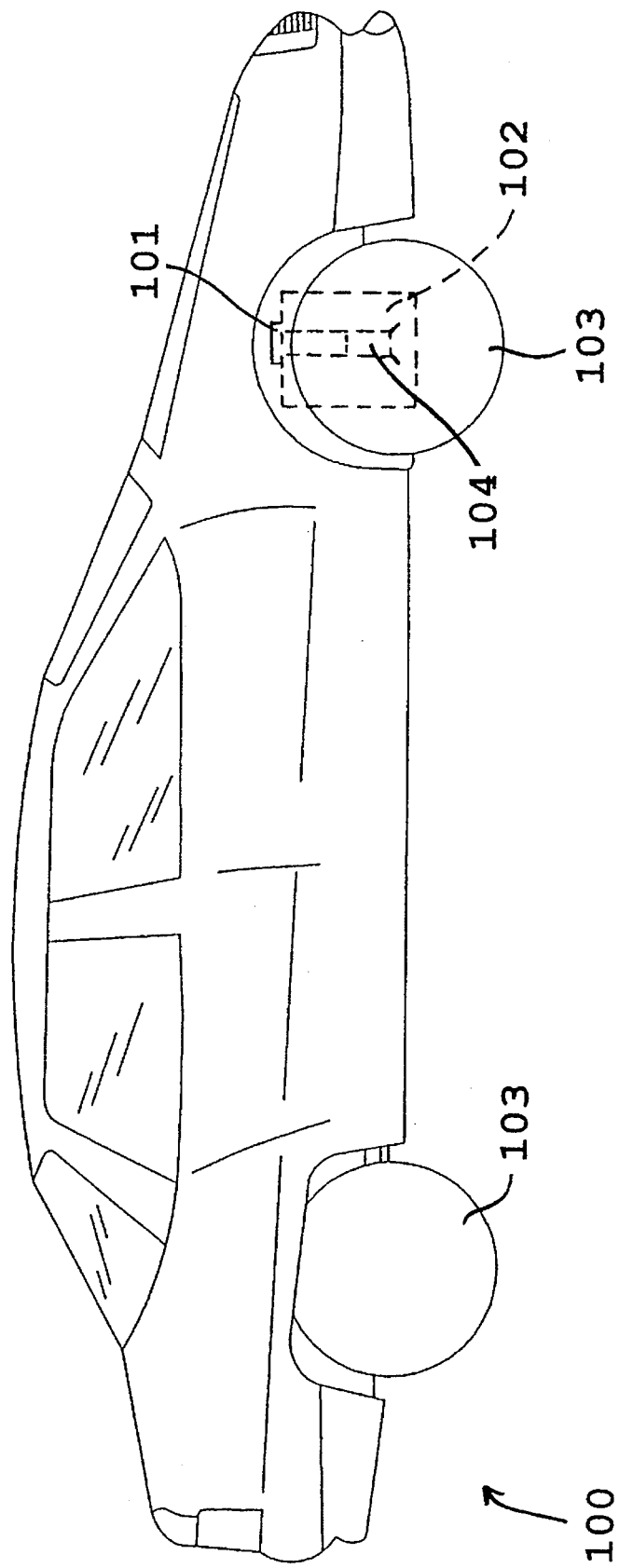
FIG. 4 shows a typical motor vehicle having a vibration damper unit associated with a wheel suspension.

In FIG. 1, the cylinder of a vibration damper is designated 1, and the piston rod is designated 3. The cylinder 1 can typically be closed on one end, generally the bottom, by a base 5. The base 5 can generally be provided with a connection device 4 for connecting the bottom end of the cylinder 1 to, for example, the wheel suspension of a motor vehicle. A general depiction of a motor vehicle 100 and vibration damper unit 104 is shown in FIG. 4. In FIG. 4, the wheels of the motor vehicle are designated as 103, a frame portion as 101, and a suspension system (shown only schematically) as 102.

As shown in FIG. 1, the piston rod 3 typically extends out of the cylinder 1 through an end of the cylinder 1 opposite to the base 5, i.e. an upper end in this depiction. The piston rod 3 can extend through a guide and seal unit 7 to thereby provide a seal about the piston rod 3 and seal the interior of the vibration damper from the exterior. At the protruding end 2 of the piston rod 3, there can preferably be a second connection device 6 for connecting the piston rod 3 to the frame of the motor vehicle, or alternatively to another component of the suspension system.

Inside the cylinder 1, a piston, or piston unit 9 can be fastened to the piston rod 3. The piston unit 9 can preferably be provided with a piston valve system 11. The lower end of the cylinder 1 can be closed by a base plate 13, which base plate 13 can be provided with a base valve system 15. The cylinder 1 can be enclosed by a container tube 17. Between the container tube 17 and the cylinder 1, an annular space 19 can preferably be formed. This annular space 19 essentially provides an equalization chamber for the space within the cylinder 1.

The space inside the cylinder 1 can be divided by the piston unit 9 into a first, or lower, work chamber 21a and a second, or upper, work chamber 21b. The work chambers 21a and 21b can be essentially completely filled with hydraulic fluid. The equalization chamber, or annular space 19 can be filled up to the level 19a with fluid and above that with gas. The expandability of the gas essentially provides volume compensation within the cylinders 1 and 17 to compensate for the volume of the piston rod 3 as the piston rod 3 is moved into and out of the cylinder 1.

Inside the equalization chamber 19, an additional cylinder 10 can be provided about the cylinder 1 to form a fluid bypass 12 between cylinders 1 and 10 for bypassing fluid around the piston unit 9 between the work chambers 21a and 21b. The fluid bypass 12 can have a first segment, namely a high-pressure segment 23, which high-pressure segment 23 can be connected by means of a hole 25 of the cylinder 1 with the second work chamber 21b. Connected to this high-pressure segment 23 there can preferably be a shut-off valve device 27. Further details regarding the shut-off valve device 27 are provided herebelow. In the depicted embodiment of FIG. 1, the shut-off valve device 27 is shown attached laterally to the container tube 17. From this shut-off valve device 27, a second segment (not shown here but described later with reference to FIGS. 2 and 3), namely a low-pressure segment, can extend to the equalization chamber 19.

When the piston rod 3 is moved out of the cylinder 1, in an upward direction in FIG. 1, the upper work chamber 21b would be reduced in size. An overpressure can thereby form in the upper work chamber 21b. The overpressure can be at least partially reduced by the piston valve system 11, whereby the piston valve system 11 can permit fluid flow therethrough and into the lower work chamber 21a. As long as the shut-off valve device 27 is closed, the valve system 11 provides essentially the sole system for permitting fluid flow between chambers 21a and 21b. When the shut-off valve device 27 is opened, fluid can then flow from the upper work chamber 21b, simultaneously through both the valve system 11 into chamber 21a, and also through the high pressure segment 23, the shut-off valve device 27, the equalization chamber 19 and into lower chamber 21a. The damping characteristic of the vibration damper during the movement of the piston rod 3 out of the cylinder 1 can therefore essentially be a function of whether the shut-off valve device 27 is open or closed.

When the piston rod 3 moves into the cylinder 1, an overpressure can be formed in the lower work chamber 21a. Fluid can then travel from the lower work chamber 21a through the piston valve system 11 upward into the upper work chamber 21b. The fluid displaced by the increasing piston rod volume inside the cylinder 1 can be expelled through the base valve system 15 into the equalization chamber 19. Since the flow resistance of the piston valve system 11 can typically be less than the flow resistance of the base valve system 15, an increasing pressure can again occur in the upper work chamber 21b. When the shut-off valve device 27 is open, this increasing pressure can flow through the high pressure segment 23 into the equalization chamber 19. That means that when the shut-off valve device 27 is open, the vibration damper can also have a softer characteristic when the rod 3 is moving into the cylinder, and a harder characteristic when the shut-off valve device 27 is closed, i.e. when the piston rod 3 is moving out of the cylinder. Because of the flow resistance as discussed above, the flow direction through the high-pressure segment 23 of the bypass 12 can generally always be the same, regardless of whether the piston rod 3 is moving into or out of the cylinder 1.

An additional component of a vibration damper, as shown in FIG. 1, can include an outer cylindrical sleeve 14 attached to the end 2 of the piston rod 3. This sleeve 14 can preferably protect the piston rod 3 when the piston rod 3 is pulled out of the cylinder 1.

Figure 2:
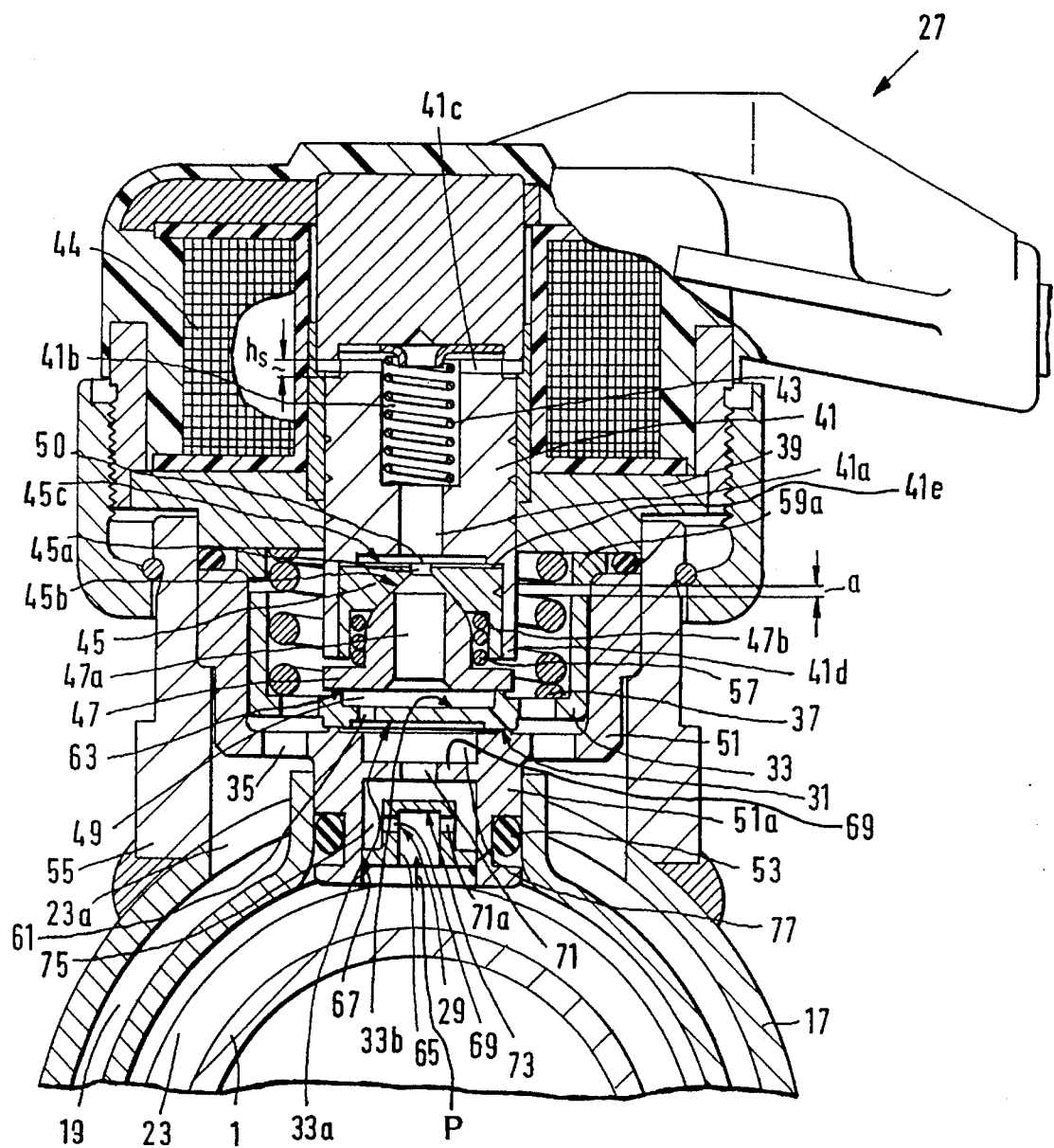
FIGS. 2–3 show differing embodiments of the shut-off valve device.

FIG. 2 shows a cross section of cylinder 1, with the high-pressure segment 23 of the bypass 12 and the equalization chamber 19. Connected to the high-pressure segment 23 there can be a central channel 29, which central channel 29 corresponds to the shut-off valve device 27. In the upper end of the central channel 29, there can be a shut-off valve seat 31. A shut-off valve body, preferably in the form of a rigid shut-off valve plate 33, can be in contact with the shut-off valve seat 31. In FIG. 2, the shut-off valve plate 33 is shown in its shut-off position, whereby the connection between the central channel 29 and the equalization chamber 19 by means of holes 35 would then essentially be closed. The shut-off valve plate 33 can be biased, by means of a coil compression spring 37, toward the shut-off valve seat 31. The spring 37 can be supported on a separation, or partition plate 39. The plate 33 can preferably move under a sufficient pressure acting on surface 33a thereof a distance (a) to abut against a blocking member 59a.

Located in the shut-off valve device 27, concentric to the central channel 29, there can be a magnet armature 41. This magnet armature 41 can be biased downwardly, by a magnet armature prestress spring 43, toward the shut-off valve plate 33, and can be pulled upward by a magnet winding 44 when a current is sent through this magnet winding 44.

Between the magnet armature 41 and the shut-off valve plate 33, there can preferably be an intermediate body module 45, 47. The intermediate body module 45, 47 can comprises a control chamber discharge valve body 45 and a supplementary discharge valve body 47.

A passage 41a in the magnet armature 41 connects a spring chamber 41b, which spring chamber 41b houses the magnet armature prestress spring 43, with a space 49 located between the supplementary discharge valve body 47 and the shut-off valve plate 33. A passage 47a can be provided in the supplementary discharge valve body 47, and a passage 45a can be provided by the control chamber discharge valve body 45. Together, the passage 47a in the supplementary discharge valve body 47, and the passage 45a of the control chamber discharge valve body 45, passage 41a of the magnet armature 41, spring chamber 41b and a space 41c located above the magnet armature, can form a control chamber 50.

The underside of the shut-off valve plate 33 is designated 33a, and the upper side is designated 33b. The shut-off valve plate 33 is exposed from below to the pressure (P) in the central channel 29, i.e. the pressure in the upper work chamber 21b, illustrated in FIG. 1, and in the high pressure segment 23.

The shut-off valve plate 33 is located in a basin-shaped insert 51. The basin-shaped insert 51 has the hole 35 and has a tube socket 51a, directed downwardly in FIG. 2. This tube socket 51a forms the central channel 29 and is preferably tightly connected, by means of a seal 53, to the first segment 23 of the bypass. The basin-shaped insert 51 can be inserted in a tube socket 55, which tube socket 55 can be welded to the container 17. The space between the basin-shaped insert 51 and the tube socket 55 forms a low-pressure segment 23a of the bypass 12. Together, the high-pressure segment 23 and the low-pressure segment 23a form the bypass 12. Placed on the basin 51 is the separation plate 39, which separation plate 39 can form a module together with the iron parts corresponding to the magnet winding 44 and the housing parts.

When the magnet windings 44 are not carrying a current, the control chamber discharge valve body 45 can be in the shut-off position, illustrated in FIG. 2, wherein a cone 45b of the control chamber valve body 45 rests on a ring zone 47b of the supplementary discharge valve body 47, which ring zone 47b forms the control chamber discharge valve seat. A coil compression spring 57 prestresses, or biases the control chamber discharge valve body 45 away from the control chamber discharge seat 47b. The control chamber discharge valve body 45 can be guided in a sealed manner in a tubular extension 41d of the magnet armature 41. As a result of the supplementary closing force generated by the magnet armature bias spring 43, in the illustrated shut-off position of the control chamber discharge valve 45, 47b, the magnet armature 41 can lie on the control chamber discharge valve body 45 and hold the valve body in its shut-off position against the force of the spring 57.

The pressure prevailing in the control chamber 50 is essentially transmitted to the entire reverse side 45c of the control chamber discharge valve body 45 by means of channels 41e formed in the magnet armature 41. Since the control chamber discharge valve body 45 presents a larger pressurization surface 45c to the pressure (P) in the control chamber 50 than does the supplementary discharge valve body 47 in the vicinity of the space, or chamber 49, the pressure (P) in the control chamber 50 can essentially exert a hydraulic closing force directed downward on the intermediate body module 45, 47. In this position, the maximum stroke travel ($h_s$) can essentially be available for the magnet armature 41.

When the magnet winding 44 is energized in response to an opening command from the external signal source, the magnet armature 41 can consequently be raised from the control chamber discharge valve body 45 so that the magnet armature 41 can travel the entire stroke distance ($h_s$). Then, the control chamber discharge valve body 45 can remain in its shut-off position when the pressure (P) in the control chamber 50 is greater than a predetermined limit value ($P_G$) of the pressure, since the hydraulic closing force exerted by the pressure (P) on the reverse side 45c of the control chamber discharge valve body 45 can be greater than the opening force exerted by the spring 57 on the control chamber discharge valve body 45.

If the pressure (P) in the control chamber 50 is less than the limit value ($P_G$), as a result of the reduction of the pressure in the central channel 29, then the control chamber discharge valve body 45, on account of the now dominant spring force of the spring 57, can be raised from the control chamber discharge valve seat 47b. Damping fluid can then flow between the control chamber discharge valve body 45 and the control chamber discharge valve seat 47b, through to the equalization chamber 19. As a result, the pressure (P) acting on the reverse side 45c can be reduced to the extent that the control chamber discharge valve body 45, as a result of the force of the spring 57, can be raised completely from the control chamber discharge valve seat 47 and the passage 45a can be completely opened. At high flow rates, as a result of the pressure decrease which can occur at the passage 45a, a force directed toward the opening of a supplementary discharge valve (formed by the valve body 47 and a seat 63) can be exerted on the supplementary discharge valve body 47, and the supplementary discharge valve 47, 63 opens. The shut-off valve 33, 31 can then act together with the spring 37 as a standard spring-loaded damping valve.

To eliminate noises caused by fluid flow through the bypass 12, the central channel 29 can preferably be provided with a thimble-like insert 65. This insert 65, can be fastened by partial deformations 67 of the tube socket 51. In the insert 65 there can be radial openings 69, and the outlet of the openings 69 can be directed toward the wall of the central channel 29. Adjacent to the thimble-like insert 65 there can be an additional throttle point 71. The throttle point 71 can preferably be configured with an extension 71a, in this embodiment a radial extension. The extension 71a essentially is provided to prevent the flow, which bypasses, or flows past a baffle, from striking the shut-off valve plate 33 directly.

With the thimble like insert 65 in place, any damping medium flowing under high pressure into the central channel 29 would strike an end surface 73 of the thimble-like insert 65, and would be deflected by the insert 65 into the radial openings 69. The wall of the central channel 29, together with the outer surface of the thimble-like insert 65, forms a smoothing chamber 75 which effectively prevents a foaming of the damping medium as the damping medium exits from the radial openings 69.

From the smoothing chamber 75, the damping medium flows via the additional throttle point 71 toward the underside 33a of the shut-off valve plate 33. A second smoothing chamber 77 can be formed by the additional throttle point 71 in connection with the under side 33a of valve plate 33.

The series connection of the throttle points in connection with the smoothing chambers 75, 77 essentially provides a controlled pressure decrease, to decrease the pressure to a pressure level which is necessary for the desired characteristics. As a result of the smoothing chambers, there is a controlled baffling, or deflection of the damping fluid to thereby prevent noise.

The thimble-like insert 65 can also be retro-fitted into a series of already assembled vibration dampers, if noises are generated by the vibration dampers. For retro-fitting, the valve devices 27 would essentially need to be disassembled from the container tube 17, at which juncture a thimble-like insert 65 could simply be inserted into the central channel 29, and the valve device 27 could be re-attached to the container tube 17.

Figure 3:
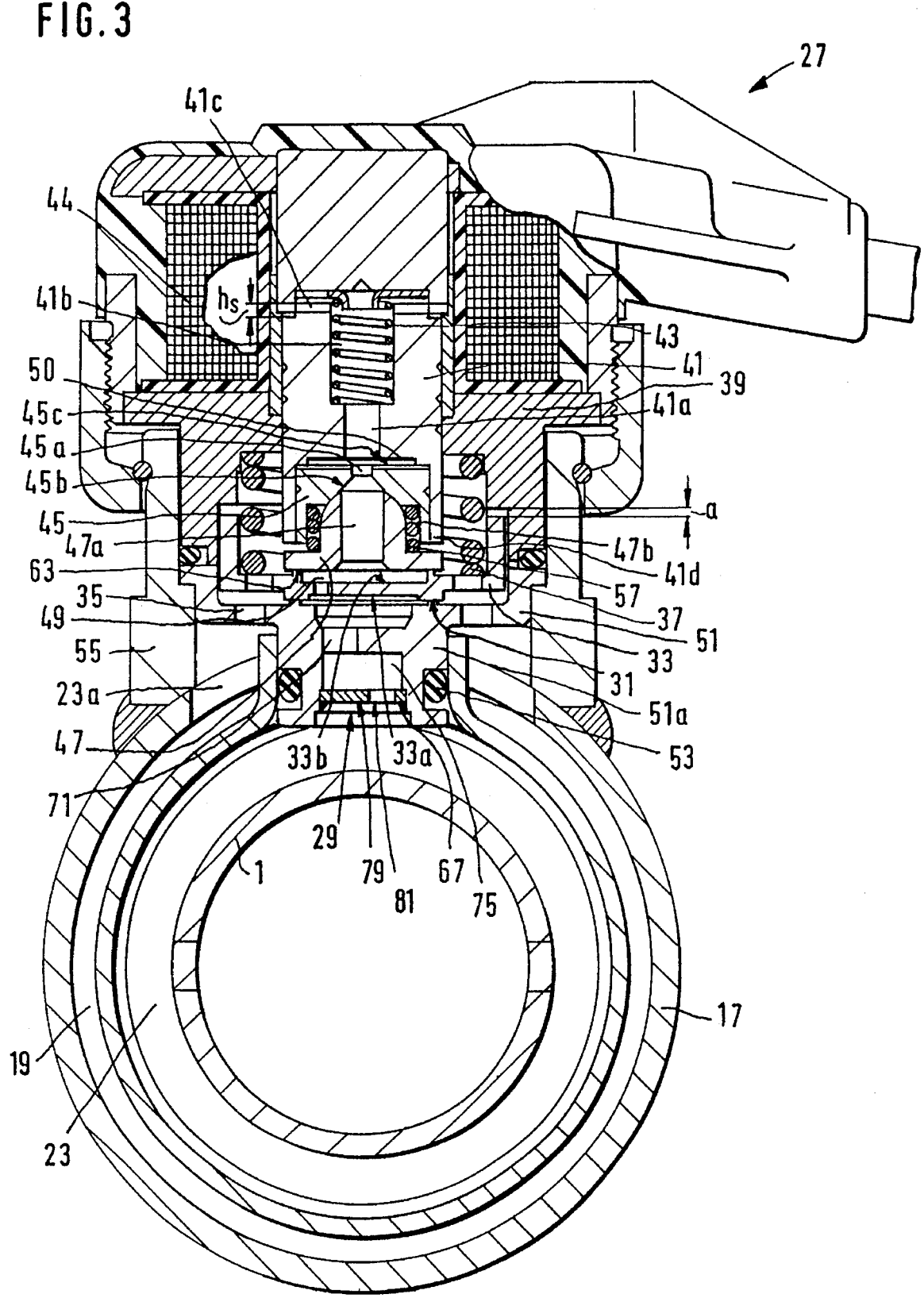

In one alternative embodiment, as illustrated in FIG. 3, instead of the thimble-like insert 65, there can be a throttle plate 79 inserted in the central channel 29. The throttle plate 79 can have a throttle opening 81. Here again, the throttle openings 71, 81 have a radial or circumferential offset for a deflection of the flow path. The distance of the throttle plate 79 from the additional throttle point 71 in the tube socket 51, together with the wall of the central channel 29, forms the smoothing chamber 75. It can then be seen that several smoothing chambers 75 could be realized by means of a series arrangement of throttle plates 79. The desired damping force characteristics of the vibration damper essentially dictate the size of the opening cross sections of the throttles 71, 79, as well as the distances between the throttle plates 79 and the distance between the outlet of the radial openings 69 of the thimble-like insert 65 and the wall, as illustrated in FIG. 2.

In general, the thimble-like insert 65 and throttle plate 79 provide a simple device which can be inserted into pre-existing openings of a central channel 29 of a valve device 27, to essentially divert the flow of damping medium from a substantially straight line. In other words, substantially linear flow of damping fluid into contact with the valve plate 33 is essentially prevented.

In the embodiment of FIG. 2, the fluid flow can be diverted through a plurality of substantial angles in flowing from the high pressure segment 23 to the annular space 19. As can be seen, after entering the thimble-like insert 65, in a direction towards the plate 33, the fluid would be first diverted about 90° and radially outwardly. From this flow direction, the fluid would then be diverted about 180° and radially inwardly, and then a final diversion of about 90° would put the fluid back into its original direction of movement toward the plate 33.

Similarly, in the embodiment of FIG. 3, the fluid would essentially be diverted through two maximum angles of about 90° each, and where it could be seen that minimum angles of diversion could possibly be two angles of about 45° each.

Each of the two above-discussed embodiments also generally have, in addition to changes in flow direction, changes in flow cross-section as a result of the various passage portions of different cross section. In FIG. 3, there are at least the two openings 71 and 81 which have significantly smaller cross-sections than the central passage 29 and chamber 75. In this respect, the diameter ratios of the opening 71 and 81 with respect to the central passage 29 can preferably be about 1:3 and about 4:9, respectively, and could also encompass a range of ratios between these two values. Similar ratios are also present in FIG. 2, wherein, instead of a single opening 81 as in FIG. 3, the embodiment of FIG. 2 has two openings 69, of a smaller diameter than the opening 81 of FIG. 3. Fluid flowing through these restricted openings is therefore going to undergo several changes in flow rate and pressure, which when going from a higher pressure in a restricted passage to a lower pressure in a wider passage creates a smoothing effect in the fluid flow.

One feature of the invention resides broadly in the shut-off valve device between two portions of a fluid connection which connects two fluid chambers of a vibration damper to one another, whereby the shut-off valve device has at least one shut-off valve which separates a high-pressure section and a low-pressure section, and the latter shut-off valve has a shutoff body which can be adjusted by an external control by means of a magnet armature and a magnet coil between a closed and an open position, whereby the high pressure section empties into a central channel, and a first side of the shut-off valve body which is pressurized by the high pressure section can be elastically pressed against a shut-off valve seat by means of a compression spring, whereby the first side of the shut-off valve body is connected by means of an after-throttle to a second side of the shut-off valve body, characterized by the fact that in the fluid connection 23, there is a line segment which has a pressure reduction by means of at least one throttle point 67, 71, 81 in combination with a baffle device 65, 75, 77, 79 which is connected to the throttle point.

Another feature of the invention resides broadly in the shut-off valve device characterized by the fact that the line segment is formed by a thimble-like insert 65.

Yet another feature of the invention resides broadly in the shut-off valve module characterized by the fact that the thimble-like insert 65 has at least one radial opening 69, the outlet of which is oriented toward the wall of the central channel 29.

Still another feature of the invention resides broadly in the shut-off valve module characterized by the fact that connected to the thimble-like insert 65 is at least one additional throttle point 71, which has an offset with respect to the after-throttle 61.

A further feature of the invention resides broadly in the shut-off valve module characterized by the fact that the line segment has a series of throttle cross sections 71, 81 at some distance from one another, whereby the throttle cross sections are each offset from one another, and at least one throttle cross section 81 is realized inside a throttle plate 79.

Another feature of the invention resides broadly in the shut-off valve module characterized by the fact that the series is located inside the central channel 29.

Some additional examples of vibration dampers, and the components thereof, which could possibly be used in conjunction with components as set forth above in the context of the present invention, might be, or are disclosed by the following U.S. Pat. No. 5,353,897 to Felix Wossner, entitled "Vibration Damper"; U.S. Pat. No. 5,353,898 to Handke et al., entitled "Vibration Damper Unit"; U.S. Pat. No. 5,363,945 to Lizell and Vanroye, entitled "Control Valve for Shock Absorbers"; U.S. Pat. No. 5,184,703 to Wilhelm Van Zeggeren, entitled "Shock Absorber with Piston Valve for Adjustable Damping"; U.S. Pat. No. 5,201,388 to Tommy Malm, entitled "Shock Absorber"; U.S. Pat. No. 5,248,014 to Masahiro Ashiba; U.S. Pat. No. 5,303,804 to Ewald Speiss, entitled "Shock Absorber for Damping Courses of Motion of A Vehicle"; U.S. Pat. No. 5,305,860 to Rotharmel etal., entitled. "Remote Controlled Vehicle Damper"; and U.S. Pat. No. 5,332,069 to Murakami, entitled "Shock Absorber".

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

The corresponding foreign patent publication applications, namely, Federal Republic of Germany Patent Application No. P 44 24 436.3, filed on Jul. 12, 1994, having inventors Otto Samonil, and DE-OS P 44 24 436.3 and DE-PS P 44 24 436.3, any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for a suspension of a motor vehicle for damping vibrations between a wheel and a frame of a motor vehicle, said vibration damper having an exterior, the exterior defining a side of said vibration damper, and said vibration damper comprising:

a cylinder;

said cylinder defining a chamber therewithin;

said cylinder having a first end and a second end, and said cylinder defining a longitudinal dimension between the first end and the second end;

means for connecting said cylinder to one of: a wheel and a frame of a motor vehicle;

a piston rod;

said piston rod extending along the longitudinal dimension and extending through the first end of said cylinder;

said piston rod having a first end within said cylinder and a second end outside of said cylinder;

means for connecting said piston rod to the other of a wheel and a frame of a motor vehicle;

a piston disposed at said first end of said piston rod;

said piston dividing said chamber into a first chamber portion and a second chamber portion;

damping fluid disposed within said first chamber portion and said second chamber portion;

fluid passage means connecting said first chamber portion and said second chamber portion for bypassing fluid around said piston;

valve means for regulating flow of damping fluid through said fluid passage means; and an electromagnet for controlling operation of said valve means;

said valve means being attached to the side of said vibration damper, and said valve means comprising:
      a valve seat;
      a valve closure member disposes adjacent said valve seat for closing against said valve seat;
      means for closing said valve closure member with respect to said valve seat to substantially close said fluid passage means;
      means for permitting opening of said valve closure member with respect to said valve seat to open said fluid passage means;

said electromagnet comprising means for operating at least one of said means for permitting opening and said means far closing;

at least one fluid passage portion disposed adjacent said valve seat, said at least one fluid passage portion defining a longitudinal direction extending away from said valve seat and a longitudinal axis oriented parallel with respect to said longitudinal direction;

said cylinder having a higher-pressure channel, disposed generally along the longitudinal dimension of said cylinder, for conducting fluid under higher pressure;

said cylinder having a lower-pressure channel, disposed generally along the longitudinal dimension of said cylinder and concentrically with respect to said high-pressure channel, for conducting fluid under lower pressure;

said valve means comprising means for providing fluid communication between said higher-pressure channel and said lower-pressure channel;

said higher-pressure channel being concentrically nested radially inwardly of said lower-pressure channel, with respect to said longitudinal axis of said cylinder;

said at least one fluid passage portion having an inlet portion opening into said higher-pressure channel of said cylinder;

said at least one fluid passage portion extending from said inlet portion to said valve seat, to generally promote the flow of fluid, along an axis of flow that is generally parallel to the longitudinal axis of said at least one fluid passage portion, from said inlet portion to said valve seat, to open said valve closure member from said valve seat in a direction away from said at least one fluid passage portion; and insert means having been inserted in said at least one fluid passage portion, for locally diverting fluid flow within said at least one fluid passage portion through at least one substantial angle with respect to said longitudinal direction of said at least one fluid passage portion, to locally displace the axis along which fluid flows through said at least one passage portion to a substantial degree with respect to said longitudinal axis of said at least one fluid passage portion.

2. The vibration damper according to claim 1, wherein:

said at least one fluid passage portion comprises a tubular passage;

said tubular passage having a cross-sectional dimension substantially transverse to said longitudinal direction;

said insert means comprises at least one insert inserted into said tubular passage; and said at least one insert comprising at least a portion thereof extending substantially transverse to said longitudinal direction of said tubular passage for diverting fluid flow through said at least one substantial angle.

3. The vibration damper according to claim 2, wherein:

said insert comprises a thimble-like insert having been inserted into said tubular passage;

said insert has a first end end a second end;

said first end being closed;

said second end comprises a radially extending flange, extending radially outwardly;

said radially extending flange having an outside periphery;

said tubular passage having an inside configuration;

said outside periphery of said extending flange substantially corresponds to said inside configuration of said tubular passage; and said insert comprises at least one radial opening extending between said first and second ends of said tubular element, said at least one radial opening being configured to divert fluid flow from said longitudinal direction through said at least one substantial angle.

4. The vibration damper according to claim 3, wherein:

said tubular passage comprises a throttling arrangement disposed downstream of said tubular element in the flow direction of said damping fluid for diverting fluid flow passing through said tubular element through at least one additional substantial angle;

said throttling arrangement comprises at least one opening therein for diverting fluid flow back into the longitudinal direction of said tubular passage towards said valve closure member; and said at least one opening of said throttling arrangement having a cross-sectional dimension substantially transverse to the longitudinal direction of said tubular passage, and said cross-sectional dimension of said at least one opening of said at least one additional baffle means being substantially less than said cross-sectional dimension of said tubular passage.

5. The vibration damper according to claim 4, wherein:

said valve closure member has a first side disposed towards said valve seat and a second side disposed opposite to said first side away from said valve seat;

said valve closure member comprises a throttle opening therethrough for providing fluid communication between said first side and said second side of said valve closure member; and said throttle opening of said valve closure member is radially offset from said at least one opening of said throttling arrangement.

6. The vibration damper according to claim 5, wherein:

said cylinder comprises a first cylinder;

said chamber comprises a first chamber;

said vibration damper comprises a second cylinder disposed substantially concentrically about said first cylinder;

said first chamber and said second cylinder define a second chamber therebetween;

said first chamber comprises said higher-pressure channel;

said second chamber comprises said lower-pressure channel;

said first chamber portion comprises a chamber portion disposed between said piston and said first end of said cylinder;

said second chamber portion comprises a chamber portion disposed between said piston and said second end of said cylinder;

said second end of said first cylinder comprises a valve assembly for permitting fluid flow between said second chamber portion of said first chamber and said second chamber;

said piston comprises additional valve means for bypassing damping fluid between said first chamber portion and said second chamber portion;

said valve assembly of said second end of said first cylinder having resistance to fluid flow therethrough, said valve assembly of said second end of said first cylinder having resistance to fluid flow therethrough, said resistance to fluid flow of said valve assembly being greater than said resistance to fluid flow of said additional valve means to provide a greater fluid pressure in said first chamber portion than e fluid pressure in said second chamber portion during both insertion and removal of said piston into and out of said first cylinder;

said damping fluid flows under pressure through said fluid passage means in a single flow direction from said first chamber portion of said first chamber, through said valve means and into said second chamber when said valve means is open; and said tubular passage is disposed before said valve seat in the flow direction of said damping fluid through said fluid passage means.

7. The vibration damper according to claim 6, wherein:

said vibration damper further comprises a third cylinder disposed concentrically about said first cylinder;

said third cylinder and said first cylinder define a cylindrical space therebetween;

said cylindrical space forms a substantial portion of said fluid passage means;

said vibration damper defines a longitudinal dimension;

said single fluid passage portion is disposed radially with respect to said longitudinal dimension and connects said cylindrical space with said valve means;

said valve seat is disposed radially inwardly of said valve closure member;

said electromagnet is disposed radially outwardly of said valve closure member;

said means for closing said valve closure member with respect to said valve seat comprises first spring means disposed adjacent said second side of said valve closure member to bias said valve closure member radially inwardly towards said valve seat;

said means for permitting opening of said valve closure member comprises said electromagnet;

said electromagnet comprising an armature movable between a first position disposed towards said valve closure member and a second position disposed away from said valve closure member;

said valve closure member being biased away from said armature by second spring means and said valve closure member being movable away from said valve seat by fluid pressure in said tubular passage against said second spring to open said fluid passage means;

said first end of said tubular element is disposed towards said throttling arrangement;

said at least one opening of said throttling arrangement has a central axis disposed in the longitudinal direction of said tubular passage;

said tubular element has a central axis disposed in the longitudinal direction of said tubular passage;

said central axis of said at least one opening being substantially colinear with said central axis of said tubular passage;

said first end of said tubular element having a cross-sectional dimension substantially transverse to the longitudinal direction of said tubular passage;

said cross-sectional dimension of said first end of said tubular element being greater then said cross-sectional dimension of said at least one opening of said at least one additional baffle means; and said tubular element and said throttling arrangement are configured for providing a fluid flow through the second end of said tubular element into the interior of said tubular element in a direction along the longitudinal direction of said tubular passage, thence from the interior of said tubular element through an angle of about 90 degrees and radially outwardly through said at least one radial passage, thence through another angle of about 90 degrees and back in a direction along the longitudinal direction of said tubular passage towards said throttling arrangement, thence through another angle of about 90 degrees and radially inwardly towards said at least one opening of said throttling arrangement, thence through another angle of about 90 degrees and through said at least one opening and back in a direction along the longitudinal direction of said tubular passage towards said valve closure member.

8. A vibration damper for a motor vehicle for damping vibrations between first and second components of the motor vehicle, said vibration damper comprising:

a cylinder;

said cylinder defining a chamber therewithin;

said cylinder having a first end and a second end, and said cylinder defining a longitudinal dimension between the first and second ends thereof;

means for connecting said cylinder to one of the first and second components of a motor vehicle;

a piston rod;

said piston rod extending along the longitudinal dimension and extending through the first end of said cylinder;

said piston rod having a first end within said first cylinder and a second end outside of said cylinder;

means for connecting said piston rod to the other of the first and second components of a motor vehicle;

a piston disposed at said first end of said piston rod;

said piston dividing said chamber into a first chamber portion between said piston and said first end of said cylinder, and a second chamber portion between said piston and said second end of said cylinder;

damping fluid disposed within said first chamber portion and said second chamber portion;

fluid passage means connecting said first chamber portion and said second chamber portion for bypassing damping fluid around said piston; and valve means for regulating flow of damping fluid through said fluid passage means, said valve means comprising:
  a valve seat;
  a valve closure member disposed adjacent said valve seat for closing against said valve seat;
  means for permitting movement of said valve closure member with respect to said valve seat to substantially close said fluid passage means;
  means for permitting movement of said valve closure member with respect to said valve seat to open said fluid passage means;
  at least one fluid passage portion disposed adjacent said valve seat and extending away from said valve seat to said high pressure chamber, said at least one fluid passage portion defining a longitudinal direction extending away from said valve seat and a longitudinal axis oriented parallel with respect to said longitudinal direction;
  at least a substantial portion of said at least one fluid passage portion having a cross-sectional dimension;
  at least one throttle means, separate from said valve closure member, being disposed in said at least one fluid passage portion for reducing a pressure of damping fluid flowing through said at least one fluid passage portion and producing a flow substantially transverse to the longitudinal direction
  said cylinder having a higher-pressure channel, disposed generally along the longitudinal dimension of said cylinder, for conducting fluid under higher pressure;
  said cylinder having a lower-pressure channel, disposed generally along the longitudinal dimension of said cylinder and concentrically with respect to said higher-pressure channel, for conducting fluid under lower pressure;
  said valve means comprising means for providing fluid communication between said higher-pressure channel and said lower-pressure channel;
  said higher-pressure channel being concentrically nested radially inwardly of said lower-pressure channel, with respect to said longitudinal axis of said cylinder;
  said et least one fluid passage portion having an inlet portion opening into said higher-pressure channel of said cylinder;
  said at least one fluid passage portion extending from said inlet portion to said valve seat, to generally promote the flow of fluid, along an axis of flow that is generally parallel to the longitudinal axis of said at least one fluid passage portion, from said inlet portion to said valve seat, to open said valve closure member from said valve seat in a direction away from said at least one fluid passage portion; and
  said at least one throttle means having an opening therethrough, said opening having a cross-sectional dimension, and said cross-sectional dimension of said opening being substantially less than said cross-sectional dimension of said at least a substantial portion of said at least one fluid passage portion.

9. The vibration damper according to claim 8, wherein:

said at least one throttle means comprises at least two throttle means;

said at least two throttle means being spaced apart from one another in the longitudinal direction of said at least one fluid passage portion;

each of said at least two throttle means being disposed adjacent another of said at least two throttle means; and said opening of each of said at least two throttle means being non-colinear with respect to the opening of another adjacent one of said throttle means to define a non-linear fluid path through said at least one fluid passage portion.

10. The vibration damper according to claim 9, wherein:

at least one of said at least two throttle means comprises an insert member inserted into said at least one fluid passage portion;

said insert member comprising a disc-shaped element;

said disc-shaped element comprising said opening of said at least one of said at least two throttle means; and said valve means comprises means for holding said inserted member in place within said at least one fluid passage portion.

11. The vibration damper according to claim 10, wherein:

said at least one fluid passage portion comprises a tubular passage;

said tubular passage having an inside configuration;

said disc-shaped element having an outside periphery; and said outside periphery of said disc-shaped element substantially corresponds to said inside configuration of said tubular passage.

12. The vibration damper according to claim 11, wherein:

said cylinder comprises a first cylinder;

said chamber comprises a first chamber;

said vibration damper comprises a second cylinder disposed substantially concentrically about said first cylinder;

said first cylinder and said second cylinder define a second chamber therebetween;

said second end of said first cylinder comprises a valve assembly for permitting fluid flow between said second chamber portion of said first chamber and said second chamber;

said piston comprises additional valve means for bypassing damping fluid between said first chamber portion and said second chamber portion;

said valve assembly of said second end of said first cylinder having resistance to fluid flow, said additional valve means of said second end of said first cylinder having resistance to fluid flow, said resistance to fluid flow of said valve assembly being greater than said resistance to fluid flow of said additional valve means to provide a greater fluid pressure in said first chamber portion than a fluid pressure in said second chamber portion during both insertion and removal of said piston into and out of said first cylinder;

said damping fluid flows under pressure through said fluid passage means in a single flow direction from said first chamber portion of said first chamber through said valve means and into said second chamber when said valve means is open; and said at least one fluid passage portion comprises a single tubular passage before said valve seat in the flow direction of said damping fluid through said fluid passage means.

13. The vibration damper according to claim 12, wherein:

said vibration damper has an exterior, said exterior defining a side of said vibration damper;

said vibration damper further comprises said valve means mounted on the side of said vibration damper;

said vibration damper further comprises a third cylinder disposed concentrically about said first cylinder;

said third cylinder and said first cylinder defining a cylindrical space therebetween;

said cylindrical space forms a substantial portion of said fluid passage means;

said vibration damper defines a longitudinal dimension;

said single tubular passage is disposed radially with respect to said longitudinal dimension and connects said cylindrical space with said valve means;

said cross-sectional dimension of said tubular passage comprises a diameter of said tubular passage;

said cross-section of said openings of said at least two throttle means comprise diameters of said openings; and said diameters of said openings are between about 3/9 and about 4/9 of said diameter of said tubular passage.

14. The vibration damper according to claim 13, wherein:

said insert member additionally comprises a tubular element for being disposed within said tubular passage;

said tubular element has a first end and a second end;

said first end being closed;

said second end comprises said disc-shaped element;

said tubular member comprises at least one radial passage between said first and second ends for diverting fluid flow from said longitudinal direction through at least one substantial angle;

said valve closure member has a first side disposed towards said valve seat and a second side disposed opposite to said first side;

said valve closure member comprises at least one additional throttle opening therethrough providing fluid communication between said first side and said second side of said valve closure member;

said valve seat is disposed radially inwardly of said valve closure member;

said vibration damper additionally comprises an electromagnet for controlling operation of said valve means;

said electromagnet is disposed radially outwardly of said valve closure member;

said means for permitting movement of said valve closure member with respect to said valve seat to close said fluid passage means comprises first spring means disposed adjacent said second side of said valve closure member to bias said valve closure member radially inwardly towards said valve seat;

said means for permitting movement of said valve closure member with respect to said valve seat to open said fluid passage means comprises said electromagnet;

said electromagnet comprising an armature, said armature having a first position disposed towards said valve closure member and a second position away from said valve closure member;

said valve closure member being biased away from said armature by second spring means, and said valve closure member being movable away from said valve seat by damping fluid pressure applied against said first side of said valve closure member with said armature in said second position; and said first end of said tubular element is disposed towards said valve seat.

15. A combination of a vibration damper and an arrangement for reducing noise produced by damping fluid moving within a damping valve of a vibration damper;

the vibration damper comprising:

a cylinder;

the cylinder defining a chamber therewithin;

the cylinder having a first end and a second end, and the cylinder defining a longitudinal dimension between the first and second ends;

a piston the piston rod extending along the longitudinal dimension and extending through the first end of the first cylinder;

the piston rod having a first end within the first cylinder and a second end outside of the first cylinder;

a piston disposed at the first end of the piston rod;

the piston dividing the chamber into a first chamber portion and a second chamber portion;

damping fluid disposed within the first chamber portion and the second chamber portion;

fluid passage means connecting the first chamber portion and second chamber portion for bypassing damping fluid around the piston; and said damping valve;

said damping valve comprising valve means for regulating flow of damping fluid through the fluid passage means, the valve means comprising:

a valve seat;

a valve closure member disposed adjacent the valve seat for closing against the valve seat;

means for permitting movement of the valve closure member with respect to the valve seat to substantially close the fluid passage means;

means for permitting movement of the valve closure members with respect to the valve seat to open the fluid passage means;

at least one fluid passage portion disposed adjacent the valve seat, the at least one fluid passage portion defining a longitudinal direction extending away from the valve seat and a longitudinal axis oriented parallel with respect to said longitudinal direction;

said cylinder having a higher-pressure channel, disposed generally along the longitudinal dimension of said cylinder, for conducting fluid under higher pressure;

said cylinder having a lower-pressure channel, disposed generally along the longitudinal dimension of said cylinder and concentrically with respect to said higher-pressure channel, for conducting fluid under lower pressure;

said valve means comprising means for providing fluid communication between said higher-pressure channel and said lower-pressure channel;

said higher-pressure channel being concentrically nested radially inwardly of said lower-pressure channel, with respect to said longitudinal axis of said cylinder;

said at least one fluid passage portion having an inlet portion opening into said higher-pressure channel of said cylinder;

said at least one fluid passage portion extending from said inlet portion to said valve seat, to generally promote the flow of fluid, along an axis of flow that is generally parallel to the longitudinal axis of said at least one fluid passage portion, from said inlet portion to said valve seat, to open said valve closure member from said valve seat in a direction away from said at least one fluid passage portion; and said combination further comprising,
a member for being inserted into the at least one fluid passage portion; and
said member comprising means for substantially reducing the cross-sectional dimension of an additional portion of said at least one fluid passage portion.

16. The combination according to claim 15, wherein:

the at least one fluid passage portion comprises a tubular passage; and said orifices divert fluid flow of the damping fluid within the tubular passage through at least one substantial angle with respect to the longitudinal direction of the tubular passage.

* * * * *

UNITED STATES PATENT AND TRADEMARK OFFICE
CERTIFICATE OF CORRECTION

PATENT NO. : 5,558,188

DATED : September 24, 1996

INVENTOR(S) : Otto SAMONIL and Steffen KRAUS

It is certified that error appears in the above-indentified patent and that said Letters Patent is hereby corrected as shown below:

In column 1, line 29, after 'the', delete "shut-of" and insert --shut-off--.

In column 1, line 44, after 'noises', delete "are:" and insert --are--.

In column 3, line 27, after 'respect', delete "Go" and insert --to--.

In column 4, line 31, after 'portion;', delete "dumping" and insert --damping--.

In column 10, line 47, after 'Felix', delete "Wossner," and insert --Wössner,--.

In column 11, line 66, Claim 1, after 'means', delete "far" and insert --for--; line 65, delete "of" and insert --of:--.

In column 12, lines 11-12, Claim 1, after 'said', delete "high-pressure" and insert --higher-pressure--.

In column 13, line 67, Claim 6, after 'than', delete "e" and insert --a--.

In column 14, line 57, Claim 7, after 'greater', delete "then" and insert --than--.

In column 16, line 19, Claim 8, after 'said', delete "et" and insert --at--.

UNITED STATES PATENT AND TRADEMARK OFFICE
CERTIFICATE OF CORRECTION

PATENT NO. : 5,558,188
DATED : September 24, 1996
INVENTOR(S) : Otto SAMONIL and Steffen KRAUS It is certified that error appears in the above-indentified patent and that said Letters Patent is hereby corrected as shown below:

In column 18, line 46, Claim 15, after 'piston' insert --rod;--.

In column 19, line 5, Claim 15, before 'with', delete "members" and insert --member--.

Signed and Sealed this

Twenty-fifth Day of March, 1997

Attest:

BRUCE LEHMAN

Attesting Officer

Commissioner of Patents and Trademarks